US012689400B2

(12) United States Patent
Chang et al.

(10) Patent No.: US 12,689,400 B2
(45) Date of Patent: Jul. 21, 2026

(54) DIGITAL PRE-DISTORTION CIRCUIT AND METHOD FOR GENERATING PRE-DISTORTION SIGNAL

(71) Applicant: Realtek Semiconductor Corp., HsinChu (TW)

(72) Inventors: Yuan-Shuo Chang, HsinChu (TW); Shin-Lin Cheng, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 232 days.

(21) Appl. No.: 18/774,896

(22) Filed: Jul. 16, 2024

(65) Prior Publication Data

US 2025/0030444 A1 Jan. 23, 2025

(30) Foreign Application Priority Data

Jul. 19, 2023 (TW) ................................. 112126931

(51) Int. Cl.
*H04B 1/04* (2006.01)

(52) U.S. Cl.
CPC ... *H04B 1/0475* (2013.01); *H04B 2001/0425* (2013.01)

(58) Field of Classification Search
CPC ...................... H04B 1/0475; H04B 2001/0425
USPC .................... 455/114.3, 114.2; 375/296, 297
See application file for complete search history.

(56) References Cited

U.S. PATENT DOCUMENTS 5,877,653 A * 3/1999 Kim ...................... H03F 1/3252
330/149
5,969,572 A * 10/1999 Jeong .................... H03F 1/3229
330/149

6,587,514 B1 * 7/2003 Wright .................. H03F 1/3247
330/149
2009/0072901 A1 * 3/2009 Yamanouchi ......... H03F 1/3223
330/149
2009/0207938 A1 * 8/2009 Jeong .................. H04L 25/4906
375/296
2019/0058446 A1 * 2/2019 Zhu ......................... H03F 3/195
(Continued)

OTHER PUBLICATIONS

Xia et al., An Out-of-Band Digital Predistortion Scheme and Its Verification for Power Amplifiers with Strong Nonlinearity, 2021, IEEE.

*Primary Examiner* — Juan A Torres

(74) *Attorney, Agent, or Firm* — Winston Hsu

(57) ABSTRACT

A digital pre-distortion circuit includes a memoryless non-linear operating circuit, an intermodulation shaping filter circuit, and a signal combination circuit. The memoryless non-linear operating circuit performs a memoryless non-linear operation upon a transmission signal to generate a first signal, wherein the first signal is an output simulation signal of a radio frequency (RF) power amplifier under the memoryless effect, and the first signal includes a signal component corresponding to the transmission signal and a signal component corresponding to an intermodulation signal of the transmission signal. The intermodulation shaping filter circuit filters the first signal to generate a second signal, wherein the second signal simulates an intermodulation signal generated by the RF power amplifier in response to the transmission signal under a memory effect. The signal combination circuit combines the transmission signal and the second signal to generate a pre-distortion signal.

14 Claims, 6 Drawing Sheets

(56)                    References Cited

U.S. PATENT DOCUMENTS

2022/0416823 A1* 12/2022 Azadet .................... H03F 3/195
2023/0421122 A1* 12/2023 Singhal .................... H04B 1/40

* cited by examiner

DIGITAL PRE-DISTORTION CIRCUIT AND METHOD FOR GENERATING PRE-DISTORTION SIGNAL

BACKGROUND OF THE INVENTION

1. Field of the Invention

The present invention is related to pre-distortion processing of a transmission signal, and more particularly, to a digital pre-distortion circuit and a method for generating a pre-distortion signal.

2. Description of the Prior Art

A wireless communication transmission device is equipped with a radio frequency (RF) power amplifier. A transmission signal is amplified by the RF power amplifier to reduce power consumption during transmission process. As the RF power amplifier is a non-linear component, some problems may occur. For example, when the transmission signal has a high peak-to-average power ratio, serious in-band signal distortion may occur after the transmission signal is processed by the RF power amplifier. This reduces signal quality, causes out-of-band energy leakage, and therefore causes interference to adjacent channels.

As a result, a novel signal processing signal method and an associated architecture that can effectively reduce the signal distortion generated after the transmission signal is processed by the RF power amplifier are urgently needed.

SUMMARY OF THE INVENTION

One of the objectives of the present invention is to provide a digital pre-distortion circuit and a method for generating a pre-distortion signal, in order to reduce interference to adjacent channels caused by intermodulation distortion output signals of a wireless communication transmission device.

According to an embodiment of the present invention, a digital pre-distortion circuit is provided. The digital pre-distortion circuit comprises a memoryless non-linear operating circuit, an intermodulation shaping filter circuit, and a signal combination circuit. The memoryless non-linear operating circuit is arranged to perform a memoryless non-linear operation upon a transmission signal to generate a first signal, wherein the memoryless non-linear operation simulates a non-linear operation of a radio frequency (RF) power amplifier configured in a wireless communication transmission device under a memoryless effect, the first signal is an output simulation signal of the RF power amplifier under the memoryless effect, and the first signal comprises a signal component corresponding to the transmission signal and a signal component corresponding to an intermodulation signal of the transmission signal. The intermodulation shaping filter circuit is coupled to the memoryless non-linear operating circuit, and is arranged to filter the first signal to generate a second signal, wherein the second signal simulates an intermodulation signal generated by the RF power amplifier in response to the transmission signal under a memory effect. The signal combination circuit is arranged to combine the transmission signal and the second signal to generate a pre-distortion signal.

According to an embodiment of the present invention, a method for generating a pre-distortion signal is provided. The method comprises: performing a memoryless non-linear operation upon a transmission signal to generate a first signal, wherein the memoryless non-linear operation simulates a non-linear operation of a radio frequency (RF) power amplifier configured in a wireless communication transmission device under a memoryless effect, the first signal is an output simulation signal of the RF power amplifier under the memoryless effect, and the first signal comprises a signal component corresponding to the transmission signal and a signal component corresponding to an intermodulation signal of the transmission signal; filtering the first signal to generate a second signal, wherein the second signal simulates an intermodulation signal generated by the RF power amplifier in response to the transmission signal under a memory effect; and combining the transmission signal and the second signal to generate the pre-distortion signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
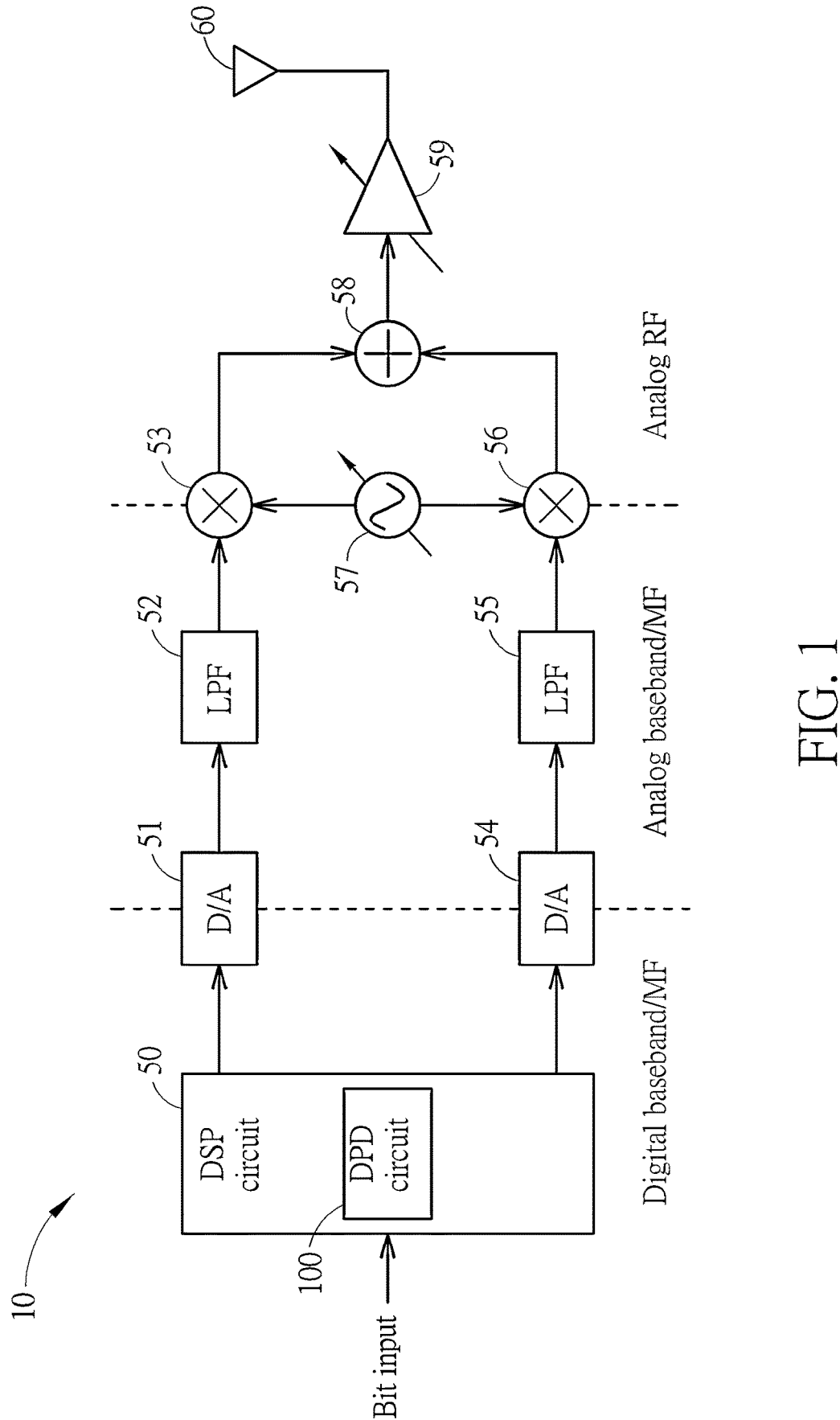
FIG. 1 is a diagram illustrating a wireless communication transmission device according to an embodiment of the present invention.

FIG. 1 is a diagram illustrating a wireless communication transmission device 10 (e.g., a Wi-Fi system) according to an embodiment of the present invention. As shown in FIG. 1, the wireless communication transmission device 10 may include a digital signal processing (DSP) circuit 50, multiple digital-to-analog converters (DACs) 51 and 54 (labeled as "D/A" in FIG. 1 for brevity), multiple low-pass filters (LPFs) 52 and 55, multiple up-converters 53 and 56, a local oscillator 57, a signal synthesizer 58, a radio frequency (RF) power amplifier 59, and an antenna 60. The DSP circuit 50 may receive a digital input signal (labeled as "bit input" in FIG. 1), and transmit an in-phase signal and a quadrature signal (e.g., a signal with 90 degree phase shifting) to the signal synthesizer 58 through two channels (e.g., an in-phase signal channel (I channel) and a quadrature signal channel (Q channel)), respectively. The RF power amplifier 59 may amplify and output a synthesized signal to the antenna 60 for transmission. In detail, output signals of the DSP circuit 50 are digital baseband/medium frequency (MF) signals. The DACs 51 and 54 may perform a digital-to-analog conversion upon digital baseband/MF signals on respective channels to generate analog baseband/MF signals. The up-converters 53 and 56 may perform an up-conversion upon analog baseband/MF signals on respective channels according to a local oscillation signal output by the local oscillator 57, to generate analog RF signals.

In order to reduce non-linear distortion generated by the RF power amplifier 59, the DSP circuit 50 may perform an associated digital pre-distortion (DPD) operation to perform corresponding pre-distortion processing upon the digital input signal based on non-linear behavior of the RF power amplifier 59, such that the non-linear distortion of the RF power amplifier 59 is reduced by the DPD operation, and an output signal with good linearity can be obtained.

In this embodiment, the wireless communication transmission device 10 may further include a DPD circuit 100, wherein the DPD circuit 100 may be disposed in the DSP circuit 50, but the present invention is not limited thereto. The DPD circuit 100 may provide a corresponding inverse function according to an estimation result of the nonlinear distortion of the RF power amplifier 59 for performing the DPD processing, in order to reduce the non-linear distortion and obtain the output signal with good linearity.

Assume that a relationship between an input signal and an output signal of the RF power amplifier 59 may be expressed as "$PA_{out}=a_1PA_{in}+a_3PA_{in}^3+a_5PA_{in}^5+\ldots$", wherein "$PA_{in}$" is the input signal, "$PA_{out}$" is the output signal, "$a_3PA_{in}^3$" is a third-order intermodulation signal generated in response to the input signal, "$a_5PA_{in}^5$" is a fifth-order intermodulation signal generated in response to the input signal, each of the third-order intermodulation signal and the fifth-order intermodulation signal is a intermodulation signal generated by the non-linear behavior of the RF power amplifier 59, and a difference value between the intermodulation signal and a first-order signal may be referred to as intermodulation distortion (IMD).

Figure 2:
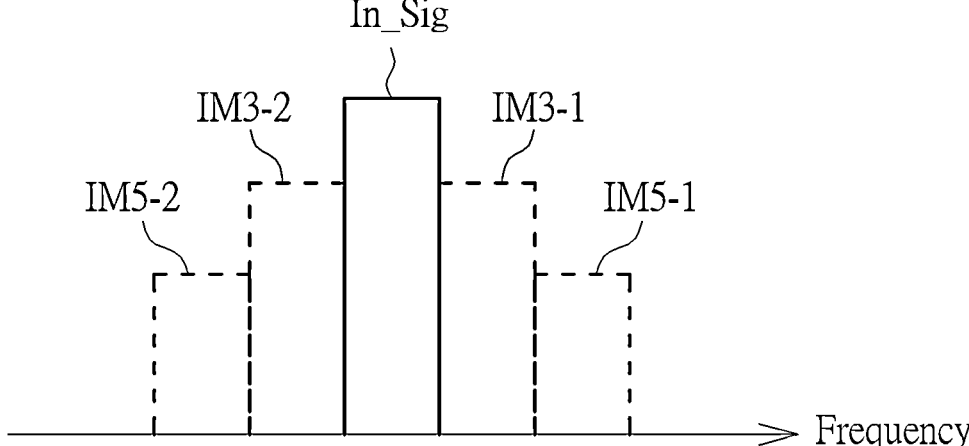
FIG. 2 is a diagram illustrating a spectrum of output signals of an RF power amplifier.

FIG. 2 is a diagram illustrating a spectrum of output signals of the RF power amplifier 59 for illustrating the IMD generated by the non-linear behavior of the RF power amplifier 59. As shown in FIG. 2, the spectrum corresponding to the output signals of the RF power amplifier 59 includes a frequency component corresponding to an input signal In_Sig, frequency components corresponding to third-order intermodulation signals IM3-1 and IM3-2, and frequency components corresponding to fifth-order intermodulation signals IM5-1 and IM5-2.

If the input signal of the RF power amplifier 59 is a dual frequency sine wave signal (e.g., an input dual frequency signal being "$PA_{in}=A_1\cos(\omega_1t)+A_2\cos(\omega_2t)$"), an output signal of the RF power amplifier 59 may be expressed as follows: $PA_{out}=(a_1A_1+3/4a_3A_1^3+3/2a_3A_1A_2^2)\cos(\omega_1t)+(a_1A_2+3/4a_3A_2^3+3/2a_3A_2A_1^2)\cos(\omega_2t)+3/4A_1^2A_2a_3\cos(2\omega_1t-\omega_2)t+3/4A_1A_2^2a_3\cos(2\omega_2t-\omega_1)t+\ldots$ wherein the parts corresponding to signals $\cos(2\omega_1t-\omega_2)t$ and $\cos(2\omega_2t-\omega_1)t$ are third-order intermodulation signal components. Since a frequency of the third-order intermodulation signal is close to that of the original input signal, the output signal quality of the RF power amplifier 59 may be easily affected by the third-order intermodulation signal. As a result, in an embodiment of the present invention, the DPD circuit 100 may simulate the third-order intermodulation signal generated by the non-linear behavior of the RF power amplifier 59 according to the input signal, and correspondingly generate a pre-distortion signal. It should be noted that the present invention is not limited to only using the DPD circuit 100 to simulate the third-order intermodulation signal. The DPD circuit 100 may also be used to simulate other-order intermodulation signals according to the needed signal quality. Since the concept of using the DPD circuit 100 to simulate third-order, fifth-order, etc. intermodulation signals is similar, the following paragraphs will use the third-order intermodulation signal for illustration.

In addition, FIG. 2 is a simplified spectrum, wherein the frequency components corresponding to the third-order intermodulation signals IM3-1 and IM3-2 and the frequency components corresponding to the fifth-order intermodulation signals IM5-1 and IM5-2 are outside a signal frequency band (or a transmission frequency band) of the input signal. In actual operations, the intermodulation signals with different orders may include a portion of frequency components inside the transmission frequency band of the input signal. The signals inside the transmission frequency band of the input signal (e.g., the frequency range of the input signal In_Sig shown in FIG. 2) may be referred to as in-band signals, and the signals outside the transmission frequency band of the input signal may be referred to as out-of-band signals. As mentioned above, the signal distortion inside the frequency band may reduce the signal quality, and the IMD outside the frequency band may cause out-of-band leakage and cause interference to adjacent channels. IEEE standards usually specify the transmit spectrum masks corresponding to each transmission frequency band. As a result, in order to comply with the transmit spectrum masks specified by IEEE, the DPD circuit 100 must perform corresponding pre-distortion processing upon the intermodulation signals outside the frequency band to reduce the out-of-band leakage and meet the transmit spectrum mask specification.

In addition to the non-linear behavior, a memory effect may exist in the operations of the RF power amplifier 59, wherein the memory effect is caused by time changes of the transmission characteristics of the amplifier, which may be defined as changes in amplitudes and phase components of a current distortion due to a previous input signal.

Figure 3:
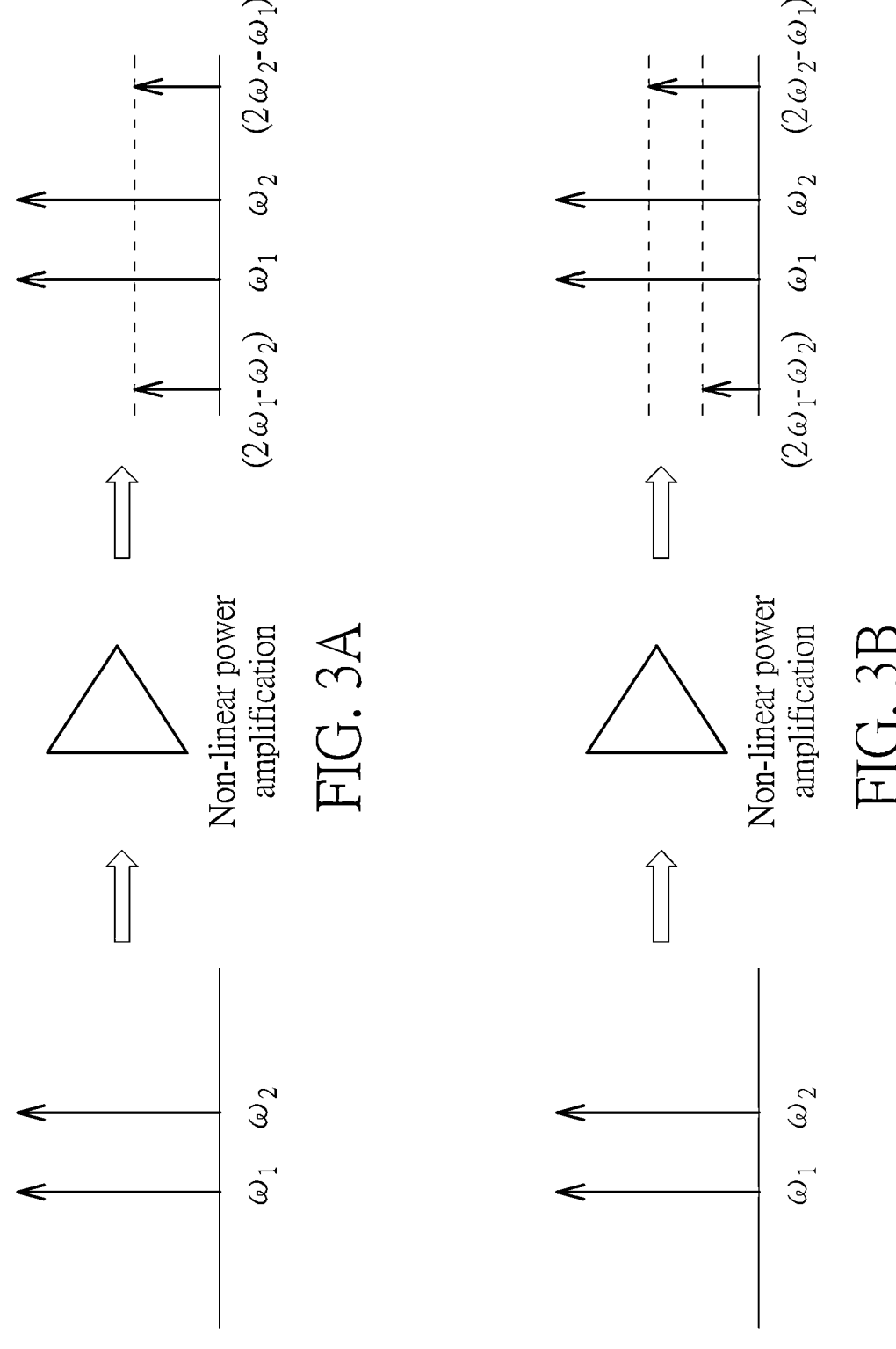
FIG. 3A is a diagram illustrating a spectrum generated after a memoryless non-linear power amplification operation of an RF power amplifier is performed.
FIG. 3B is a diagram illustrating a spectrum generated after a memory non-linear power amplification operation of an RF power amplifier is performed.

FIG. 3A is a diagram illustrating a spectrum generated after a memoryless non-linear power amplification operation of the RF power amplifier 59 is performed. FIG. 3B is a diagram illustrating a spectrum generated after a memory non-linear power amplification operation of the RF power amplifier 59 is performed. Assume that input dual-frequency signal frequencies are $\omega_1$ and $\omega_2$, respectively. After the memoryless non-linear operation is performed, the generated energy of the third-order intermodulation signal is symmetrical in the spectrum. After the memory non-linear operation is performed, the generated energy of the third-order intermodulation signal is asymmetrical in the spectrum.

The memory effect is an effect that cannot be ignored in the actual operations of the RF power amplifier 59. As a result, in an embodiment of the present invention, the DPD circuit 100 may also flexibly take the memory effect of the RF power amplifier 59 into consideration, so that the simulated intermodulation signal can more effectively cancel or reduce the non-linear distortion generated by the RF power amplifier 59.

In an embodiment of the present invention, the pre-distortion signal is generated in a two-stage manner, wherein the non-linear operations (e.g., the non-linear power amplification operations) of the RF power amplifier 59 under a memoryless effect are simulated in the first stage, and intermodulation signal components in a simulation result are shaped as the IMD under the memory effect in the second stage. Compared with the related art, the two-stage method for generating the pre-distortion signal can effectively simplify the circuit design of the DPD circuit and the operational complexity needed by the DPD circuit, which can flexibly shape the IMD according to the transmit spectrum mask specifications with which wireless communication transmission devices need to comply. In this way, the signal quality of the frequency band to be processed can be optimized, and the DPD circuit and the corresponding pre-distortion signal generation method can be widely used in various wireless communication systems.

Figure 4:
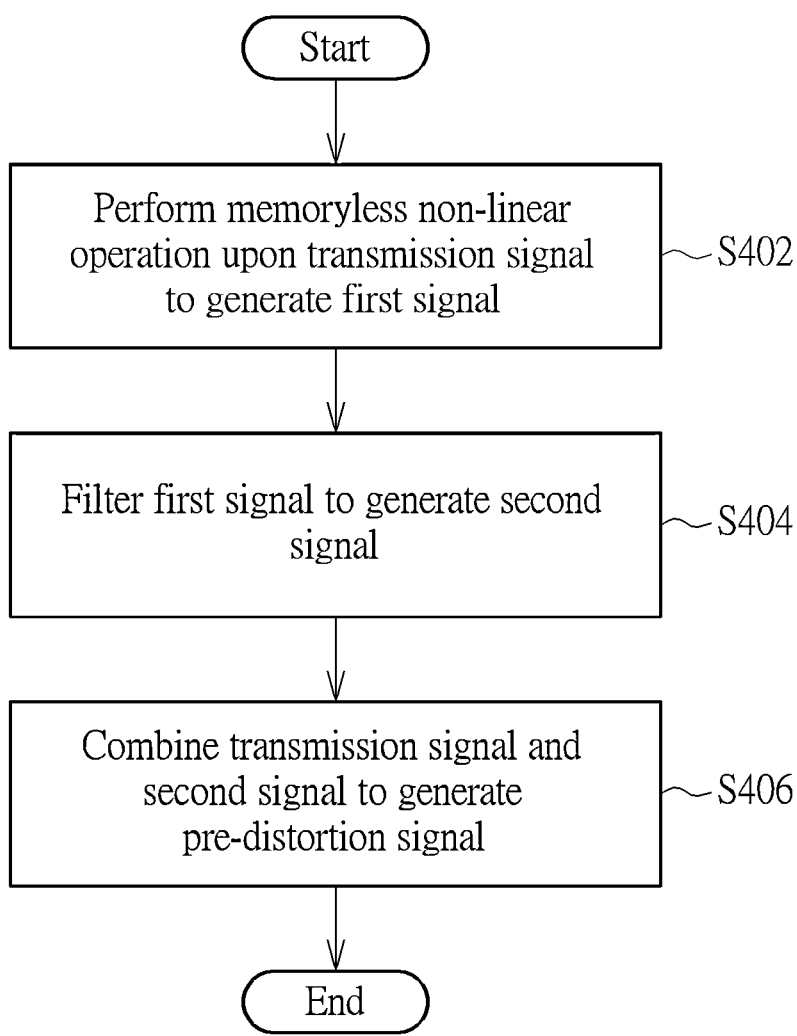
FIG. 4 is a flow chart of a method for generating a pre-distortion signal according to an embodiment of the present invention.

FIG. 4 is a flow chart of a method for generating a pre-distortion signal according to an embodiment of the present invention. The method includes the following steps.

In Step S402, a memoryless non-linear operation is performed upon a transmission signal to generate a first signal. The transmission signal is an input signal of a DPD circuit (e.g., a signal needed to be transmitted through a wireless communication transmission device). As a result, the transmission signal may eventually be transmitted after being processed by an RF power amplifier configured in the wireless communication transmission device (e.g., the RF power amplifier 59 shown in FIG. 1). In addition, the memoryless non-linear operation simulates a non-linear operation of the RF power amplifier under a memoryless effect.

In Step S404, the first signal is filtered to generate a second signal. In an embodiment of the present invention, the second signal simulates an intermodulation signal generated by the RF power amplifier in response to the transmission signal under a memory effect, and is an intermodulation signal shaped according to communication quality requirements (e.g., the transmit spectrum mask specifications to be complied with).

In Step S406, the transmission signal and the second signal are combined to generate a pre-distortion signal.

In an embodiment of the present invention, the pre-distortion signal may be provided to other signal processing devices within the wireless communication transmission device (e.g., the DACs 51 and 54, the LPFs 52 and 55, the up-converters 53 and 56, the signal synthesizer 58, and the RF power amplifier 59 that are coupled after the DSP circuit 50 shown in FIG. 1, but the present invention is not limited thereto). Since the pre-distortion signal is a signal obtained by performing corresponding pre-distortion processing upon the transmission signal, the non-linear distortion of the RF power amplifier can be reduced or canceled, and an output signal of the RF power amplifier with good linearity can be obtained at the antenna 60.

Figure 5:
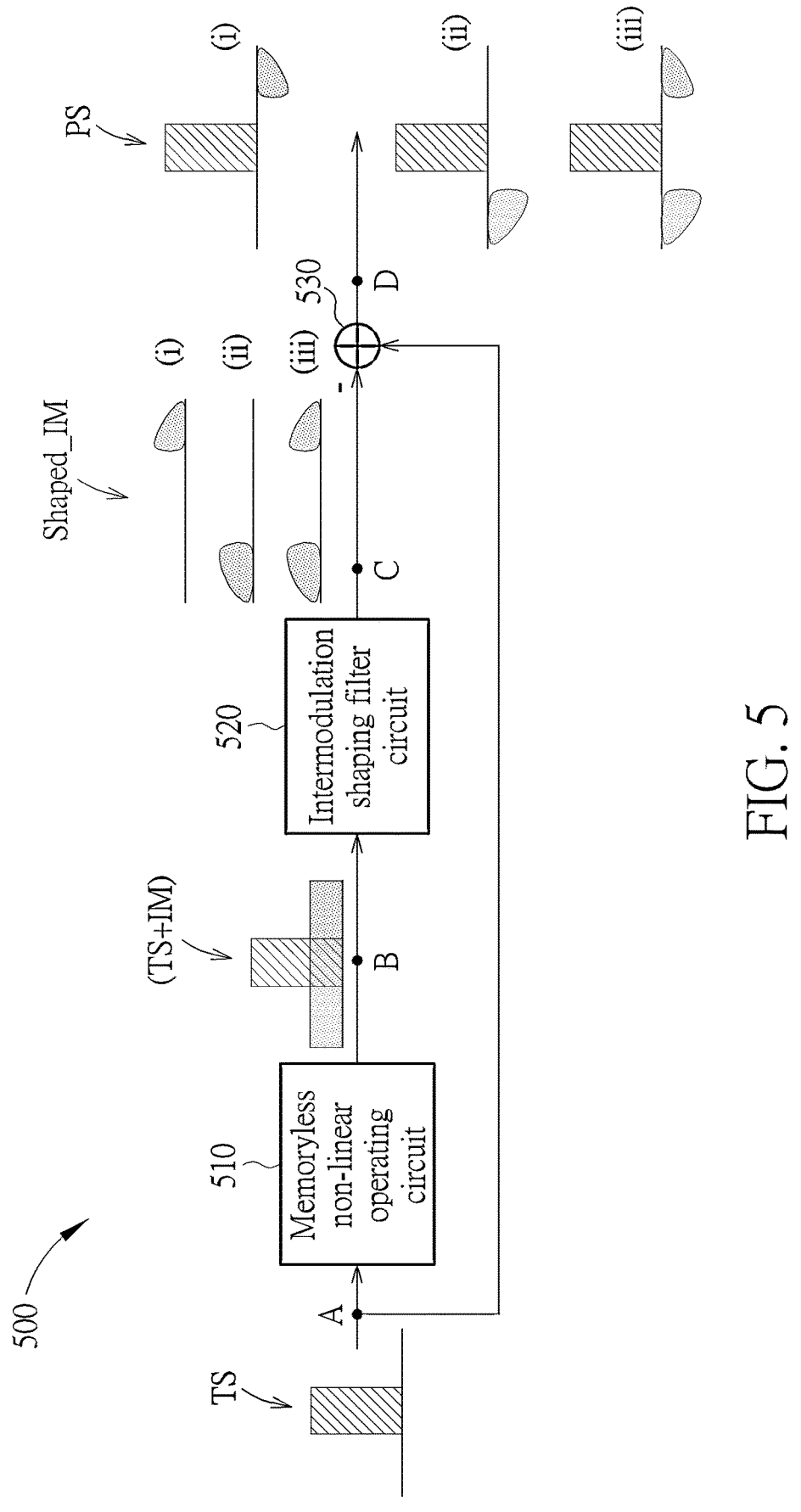
FIG. 5 is a block diagram of a digital pre-distortion circuit according to an embodiment of the present invention.

FIG. 5 is a block diagram of a DPD circuit 500 according to an embodiment of the present invention. As shown in FIG. 5, the DPD circuit 500 may include a memoryless non-linear operating circuit 510, an intermodulation shaping filter circuit 520, and a signal combination circuit 530. The above-mentioned signal processing of the first stage and the second stage may be implemented by the memoryless non-linear operating circuit 510 and the intermodulation shaping filter circuit 520, respectively.

According to an embodiment of the present invention, the memoryless non-linear operating circuit 510 may be arranged to perform a memoryless non-linear operation upon the transmission signal to generate the first signal. As mentioned above, a transmission signal TS of the memoryless non-linear operating circuit 510 is a signal needed to be transmitted through a wireless communication transmission device, and the memoryless non-linear operation simulates a non-linear operation of an RF power amplifier configured in the wireless communication transmission device under a memoryless effect. For example, the memoryless non-linear operating circuit 510 simulates the operation of the RF power amplifier, and the input signal power and the output signal power of the memoryless nonlinear operating circuit 510 are made to be the same, thereby simulating the nonlinear operation of the RF power amplifier under the memoryless effect. In addition, in an embodiment of the present invention, the first signal is an output simulation signal of the RF power amplifier under the memoryless effect, and includes a signal component corresponding to the transmission signal and a signal component corresponding to an intermodulation signal of the transmission signal.

FIG. 5 also illustrates a signal spectrum obtained at each node by the DPD circuit 500 for supporting the signal processing flow within the DPD circuit 500. Signal spectra corresponding to nodes A and B are respectively illustrated at the left and right sides of the memoryless non-linear operating circuit 510, wherein the signal spectrum near the node A is a spectrum of the transmission signal TS, and the signal spectrum near the node B is a spectrum of the first signal output by the memoryless non-linear operating circuit 510. In an embodiment of the present invention, the first signal includes a signal component corresponding to the transmission signal TS and a signal component corresponding to an intermodulation signal IM of the transmission signal TS (labeled as "(TS+IM)" in FIG. 5). In addition, in an embodiment of the present invention, the intermodulation signal IM of the transmission signal TS may be a third-order intermodulation (IM3) signal (and/or an intermodulation signal with a higher order) generated in response to the transmission signal TS, but the present invention is not limited thereto.

According to an embodiment of the present invention, the memoryless non-linear operating circuit 510 may perform the memoryless non-linear operation upon the transmission signal by utilizing a mathematical model implemented by basic logical operating components, wherein the mathematical model may simulate or describe a relationship between an input and an output of the RF power amplifier, and may simulate or describe the non-linear operation of the RF power amplifier under the memoryless effect. As a result, the obtained first signal does not include a signal component corresponding to a previous transmission signal.

For example, by inputting multiple test signals with different frequencies into the RF power amplifier and observing the corresponding output signals, a corresponding mathematical model can be obtained. It should be noted that, if a mathematical model simulates the non-linear operation of the RF power amplifier under a memory effect, the mathematical model may be a complex model (e.g., a model involving huge matrix operations). In an embodiment of the present invention, since the memoryless non-linear operating circuit 510 performs the memoryless non-linear operation upon the transmission signal, the memoryless non-linear operating circuit 510 does not need to perform complex operations, which effectively simplify the circuit design and the complexity of the memoryless non-linear operating circuit 510.

The first signal generated by the memoryless non-linear operating circuit 510 is provided to the intermodulation shaping filter circuit for filtering, to generate the second signal. A signal spectrum corresponding to a node C is illustrated at the right side of the intermodulation shaping filter circuit 520, and a signal obtained at the node C is a shaped intermodulation signal Shaped_IM (i.e., the second signal). Three different shaping results are illustrated in FIG. 5 (labeled as (i), (ii), and (iii) in FIG. 5, respectively).

According to an embodiment of the present invention, the intermodulation shaping filter circuit 520 may simulate or describe the corresponding operation of the RF power amplifier under the memory effect. Therefore, the second signal is a simulation signal for simulating an intermodulation signal generated by the RF power amplifier in response to the transmission signal under the memory effect. Compared with the signal spectrum corresponding to the node B, the energy of the intermodulation signal in the signal spectrum corresponding to the node C changes with frequency.

In an embodiment of the present invention, the second signal (i.e., the shaped intermodulation signal Shaped_IM) is an out-of-band intermodulation signal including multiple frequency components outside a transmission frequency band of the transmission signal TS. That is, the second signal may simulate an out-of-band intermodulation signal generated in response to the transmission signal or out-of-band IMD. In addition, in an embodiment of the present invention, the second signal does not include a signal component corresponding to the transmission signal TS (e.g., the spectra (i), (ii), and (iii) of the shaped intermodulation signal Shaped_IM shown in FIG. 5 do not include a frequency component corresponding to the transmission signal TS), or the second signal does not include frequency components inside a transmission frequency band of the transmission signal (e.g., in the spectrum of the shaped intermodulation signal Shaped_IM, the energy or the amplitude inside the transmission frequency band of the transmission signal is 0).

As mentioned above, in the DPD circuit proposed by the present invention, the IMD can be shaped flexibly according to the shape transmit spectrum mask specifications with which wireless communication transmission device products need to comply. As a result, the frequency response corresponding to the intermodulation shaping filter circuit 520 may be designed flexibly according to required transmit spectrum mask specifications. Assume that the local oscillation signal of the transmission signal TS is close to the right channel of the transmission frequency band of the transmission signal. The right-side out-of-band intermodulation signal generated by the RF power amplifier may become an out-of-band leakage signal, which is prone to violate out-of-band leakage regulations formulated by various countries. As a result, as shown in the spectrum (i) of the shaped intermodulation signal Shaped_IM, the intermodulation shaping filter circuit 520 may shape the right-side intermodulation signal of the transmission frequency band of the transmission signal, such that the shaped intermodulation signal Shaped_IM can simulate the intermodulation signal generated by the RF power amplifier in response to the transmission signal under the memory effect, and the spectrum (i) of the shaped intermodulation signal Shaped_IM may only include the frequency component of the intermodulation signal at the right side of the transmission frequency band. Similarly, the spectrum (ii) of the shaped intermodulation signal Shaped_IM may only include the frequency component of the intermodulation signal at the left side of the transmission frequency band. The spectrum (iii) of the shaped intermodulation signal Shaped_IM may include the frequency components of the intermodulation signals at both the right side and the left side of the transmission frequency band.

The signal combination circuit 530 may combine the transmission signal and the second signal (i.e., the shaped intermodulation signal Shaped_IM) to generate a pre-distortion signal. A spectrum of the pre-distortion signal is also illustrated in FIG. 5, wherein the right side (e.g., a node D) of the signal combination circuit 530 illustrates spectra of a pre-distortion signal PS generated according to 3 different shaped intermodulation signals (which correspond to the signal spectra (i), (ii), and (iii) of the node C). In an embodiment of the present invention, the signal combination circuit 530 may subtract the second signal from the transmission signal (or add an inverted second signal to the transmission signal) to generate the pre-distortion signal, such that the out-of-band interference components that will eventually leak out of the transmission band in the output signal of the RF power amplifier can be reduced or canceled.

It should be noted that the signal spectra shown in FIG. 5 are for illustration only, and the present invention is not limited thereto.

According to an embodiment of the present invention, the intermodulation shaping filter circuit 520 may perform a convolution operation upon the first signal according to multiple time-domain coefficients, to generate the second signal. In addition, the multiple time-domain coefficients may be generated by performing an Inverse Fourier Transform upon multiple normalized frequency point data. The multiple normalized frequency point data are generated according to amplitudes and phases of multiple intermodulation signals (or multiple IMD signals) corresponding to multiple test signals with different frequencies at multiple frequency points.

Figure 6:
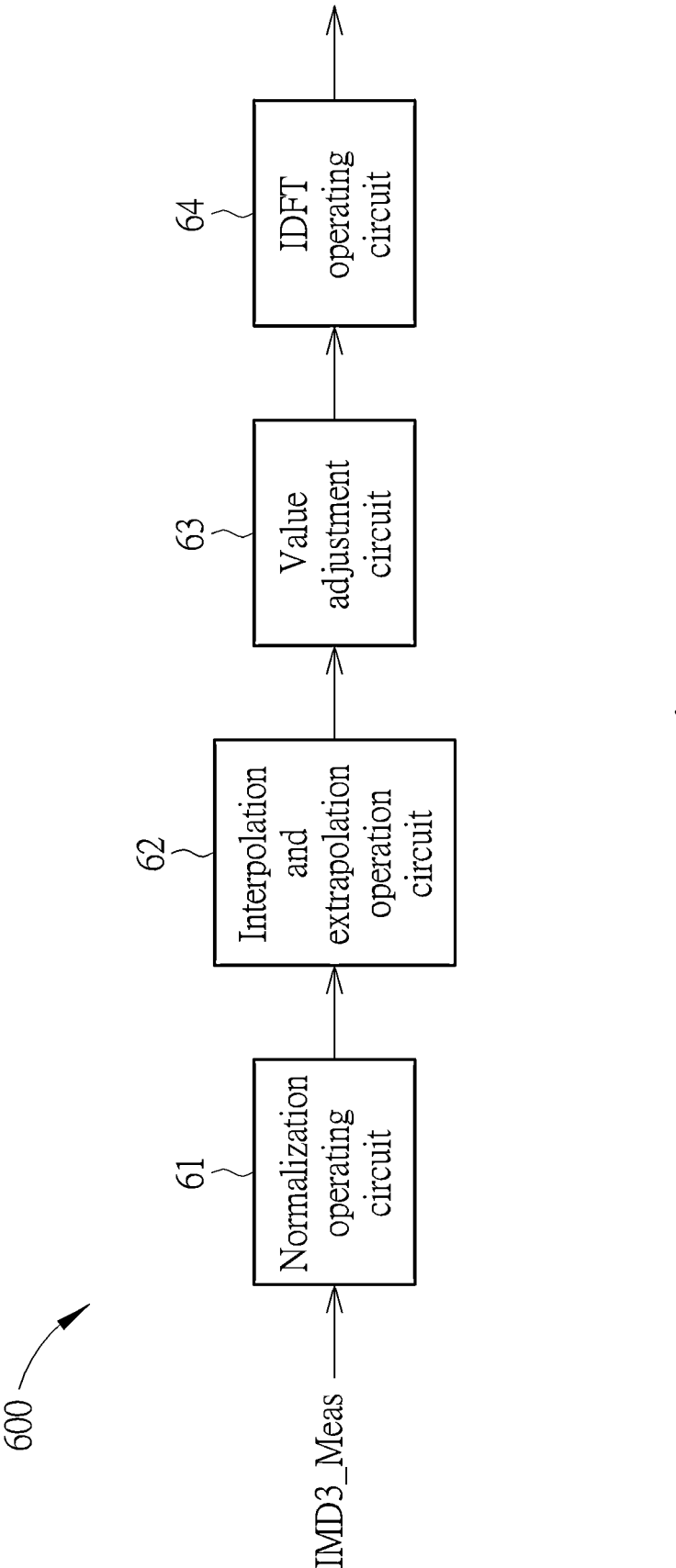
FIG. 6 is a block diagram of a coefficient generating circuit according to an embodiment of the present invention.

FIG. 6 is a block diagram of a coefficient generating circuit 600 according to an embodiment of the present invention. In this embodiment, the coefficient generating circuit 600 is arranged to create time-domain coefficients used by the intermodulation shaping filter circuit 520, and includes a normalization operating circuit 61, an interpolation and extrapolation operation circuit 62, a value adjustment circuit 63, and an Inverse Discrete Fourier Transform (IDFT) operating circuit 64.

The multiple test signals with different frequencies may be set as the input signal of the RF power amplifier, and may be input to the RF power amplifier in sequence to obtain multiple intermodulation signals (which are equivalent to multiple IMD signals) corresponding to the multiple test signals. The amplitudes and phases of the multiple intermodulation signals may be obtained at multiple frequency points (e.g., by measuring or analyzing the spectra corresponding to the multiple intermodulation signals), for acting as multiple measurement data of the multiple intermodulation signals at the multiple frequency points (labeled as "IMD3_Meas" in FIG. 6), wherein each measurement data may include an amplitude component and a phase component of the IMD.

The normalization operating circuit 61 may perform a normalization operation upon the measurement data. For example, the normalization operating circuit 61 may take measurement data corresponding to one of the multiple frequency points as reference data, and divide values corresponding to the remaining measurement data by a value corresponding to the reference data, to obtain multiple normalized frequency point data.

The interpolation and extrapolation operation circuit 62 may perform an interpolation operation and/or an extrapolation operation according to the multiple normalized frequency point data, to generate frequency point data needed by the IDFT. Since the frequency set by the test signals may not be equal to the frequency corresponding to the frequency taps needed for subsequent execution of the IDFT, the needed frequency point data can be generated by the interpolation operation and/or the extrapolation operation based on known data (i.e., the previously obtained normalized frequency point data).

The value adjustment circuit 63 may perform corresponding value adjustment upon the frequency point data needed by the IDFT according to requirements. For example, in an embodiment of the present invention, the second signal is arranged to simulate the out-of-band IMD generated in response to the transmission signal, and the value adjustment circuit 63 may set contents of frequency point data inside the transmission frequency band of the transmission signal as 0. In addition, the value adjustment circuit 63 may adjust contents of one or more frequency point data according to required transmit spectrum mask specifications. For example, the value adjustment circuit 63 may set contents of frequency point data that do not need pre-distortion processing as 0, and retain contents of frequency point data that require the pre-distortion processing.

The IDFT operating circuit 64 may perform the IDFT upon the multiple normalized frequency point data adjusted by the value adjustment circuit 63 to generate multiple time-domain coefficients, wherein the multiple time-domain coefficients may be provided to the intermodulation shaping filter circuit 520 as time-domain coefficients of the filter circuit.

According to an embodiment of the present invention, the mathematical model implemented by the memoryless non-linear operating circuit 510 and the time-domain coefficients of the intermodulation shaping filter circuit 520 may be dynamically adjusted depending upon communication requirements. For example, when the channels are switched or the required transmit spectrum mask specifications change, the mathematical model and the time-domain coefficients may be re-estimated by the test signals, thereby enabling the DPD circuit 100/500 to be widely used in various wireless communication systems.

In addition, as mentioned above, in embodiments of the present invention, the pre-distortion signal is generated in a two-stage manner including first-stage signal processing implemented by the memoryless non-linear operating circuit 510 and second-stage signal processing implemented by the intermodulation shaping filter circuit 520. Since the memoryless non-linear operating circuit 510 performs a memoryless non-linear operation upon the transmission signal, the memoryless non-linear operating circuit 510 does not need complex operations, which effectively simplifies the circuit design and the complexity of the memoryless non-linear operating circuit 510. In addition, since the time-domain coefficients of the intermodulation shaping filter circuit 520 can be dynamically adjusted according to actual communication requirements, the application range of the DPD circuit 100/500 can be increased and the signal quality of the frequency band to be processed can be optimized.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A digital pre-distortion circuit, comprising:
a memoryless non-linear operating circuit, arranged to perform a memoryless non-linear operation upon a transmission signal to generate a first signal, wherein the memoryless non-linear operation simulates a non-linear operation of a radio frequency (RF) power amplifier configured in a wireless communication transmission device under a memoryless effect, the first signal is an output simulation signal of the RF power amplifier under the memoryless effect, and the first signal comprises a signal component corresponding to the transmission signal and a signal component corresponding to an intermodulation signal of the transmission signal;
an intermodulation shaping filter circuit, coupled to the memoryless non-linear operating circuit, and arranged to filter the first signal to generate a second signal, wherein the second signal simulates the intermodulation signal generated by the RF power amplifier in response to the transmission signal under a memory effect; and
a signal combination circuit, arranged to combine the transmission signal and the second signal to generate a pre-distortion signal.

2. The digital pre-distortion circuit of claim 1, wherein the intermodulation shaping filter circuit performs a convolution operation upon the first signal according to multiple time-domain coefficients, to generate the second signal.

3. The digital pre-distortion circuit of claim 1, wherein the second signal is an out-of-band intermodulation signal comprising multiple frequency components outside a transmission frequency band of the transmission signal.

4. The digital pre-distortion circuit of claim 1, wherein the second signal does not comprise frequency components inside a transmission frequency band of the transmission signal.

5. The digital pre-distortion circuit of claim 1, wherein the first signal does not comprise a signal component corresponding to a previous transmission signal.

6. The digital pre-distortion circuit of claim 2, wherein the multiple time-domain coefficients are generated by performing an Inverse Fourier Transform upon multiple normalized frequency point data, and the multiple normalized frequency point data are generated according to amplitudes and phases of multiple intermodulation signals corresponding to multiple test signals with different frequencies at multiple frequency points.

7. The digital pre-distortion circuit of claim 1, wherein the intermodulation signal of the transmission signal is a third-order intermodulation signal generated in response to the transmission signal.

8. A method for generating a pre-distortion signal, comprising:
performing a memoryless non-linear operation upon a transmission signal to generate a first signal, wherein the memoryless non-linear operation simulates a non-linear operation of a radio frequency (RF) power amplifier configured in a wireless communication transmission device under a memoryless effect, the first signal is an output simulation signal of the RF power amplifier under the memoryless effect, and the first signal comprises a signal component corresponding to the transmission signal and a signal component corresponding to an intermodulation signal of the transmission signal;
filtering the first signal to generate a second signal, wherein the second signal simulates the intermodulation signal generated by the RF power amplifier in response to the transmission signal under a memory effect; and
combining the transmission signal and the second signal to generate the pre-distortion signal.

9. The method of claim 8, further comprising:
performing a convolution operation upon the first signal according to multiple time-domain coefficients, to generate the second signal.

10. The method of claim 8, wherein the second signal is an out-of-band intermodulation signal comprising multiple frequency components outside a transmission frequency band of the transmission signal.

11. The method of claim 8, wherein the second signal does not comprise frequency components inside a transmission frequency band of the transmission signal.

12. The method of claim 8, wherein the first signal does not comprise a signal component corresponding to a previous transmission signal.

13. The method of claim 8, wherein the step of filtering the first signal to generate the second signal further comprises:

generating multiple normalized frequency point data according to amplitudes and phases of multiple intermodulation signals corresponding to multiple test signals with different frequencies at multiple frequency points;

performing an Inverse Fourier Transform upon the multiple normalized frequency point data to generate multiple time-domain coefficients; and performing a convolution operation upon the first signal according to the multiple time-domain coefficients, to generate the second signal.

14. The method of claim 9, wherein the intermodulation signal of the transmission signal is a third-order intermodulation signal generated in response to the transmission signal.

* * * * *